United States Patent [19]

Vepy

[11] 4,365,342
[45] Dec. 21, 1982

[54] X-RAY FILM CHANGER FOR THE SERIAL RADIOGRAPHY

[75] Inventor: Tamas A. Vepy, Mississauga, Canada

[73] Assignee: Picker International, Inc., Cleveland, Ohio

[21] Appl. No.: 114,697

[22] Filed: Jan. 23, 1980

Related U.S. Application Data

[62] Division of Ser. No. 818,823, Jul. 25, 1977, abandoned, which is a division of Ser. No. 617,102, Sep. 26, 1975, Pat. No. 4,082,956.

[51] Int. Cl.³ .......................................... G03B 41/16
[52] U.S. Cl. .................................... 378/173; 378/167
[58] Field of Search .............................. 250/468, 470

[56] References Cited

U.S. PATENT DOCUMENTS

| | | | |
|---|---|---|---|
| 3,448,979 | 6/1969 | Farmer | 250/470 |
| 3,553,453 | 1/1971 | Hogan | 250/468 |
| 3,560,743 | 2/1971 | Smit | 250/470 |
| 3,775,613 | 11/1973 | Hommerin | 250/470 |
| 3,927,327 | 3/1974 | Bermas | 250/470 |

Primary Examiner—Craig E. Church
Attorney, Agent, or Firm—Watts, Hoffmann, Fisher & Heinke Co.

[57] ABSTRACT

A serial radiograph system has an improved film changer featuring reusable film pack containers. An exposure station through which X-rays are directed is virtually free of X-ray absorbing material providing a "see through" station. As a consequence of the "see through" exposure station, an image intensification tube positioned under the exposure station provides an unobstructed fluoroscopic image with minimum X-ray dosage to a patient.

The film changer utilizes film packs, each of which has a semienclosed, partially sealed, pouch. Each pouch contains a sheet of radiographic film between a pair of intensifying screens. A plurality of the film packs are stacked in a novel supply magazine and are sequentially transported to the exposure station by a transport system having a plurality of pinch roll pairs. An evacuator pinch roll pair causes uniform engagement of the screens with the film as the film pack is transported into the exposure station by exhausting the air from the pouch and creating a vacuum as it passes through the rolls. The rolls then clamp unsealed edges of the pouch in releasably sealing contact during X-ray exposure of the film for maintaining the engagement of the film and the screens by maintaining the vacuum.

6 Claims, 17 Drawing Figures

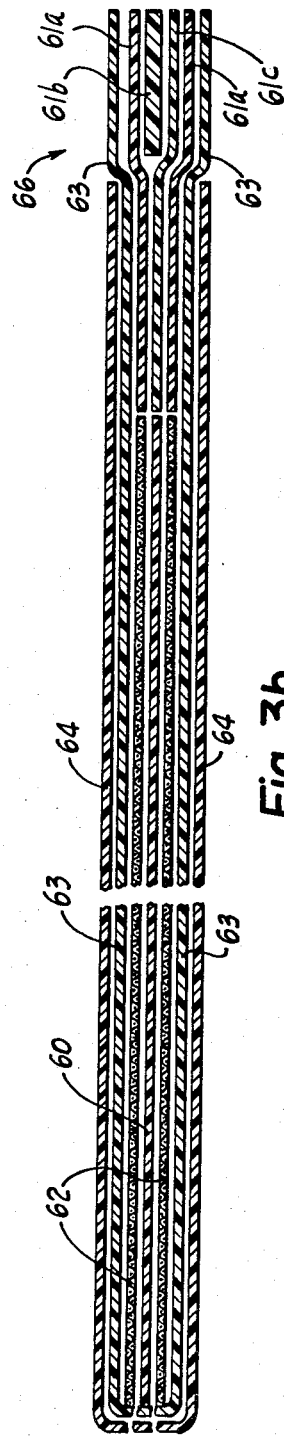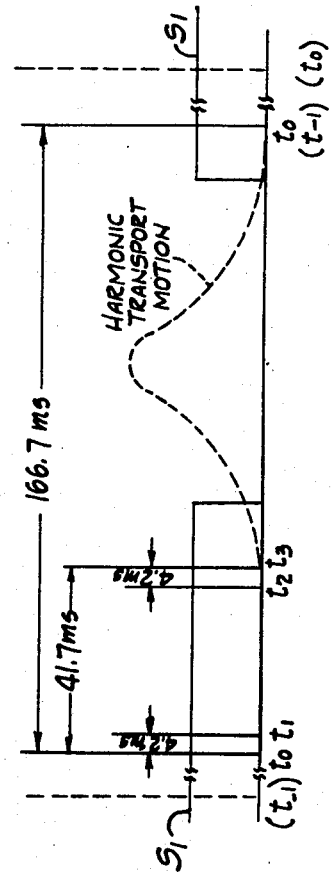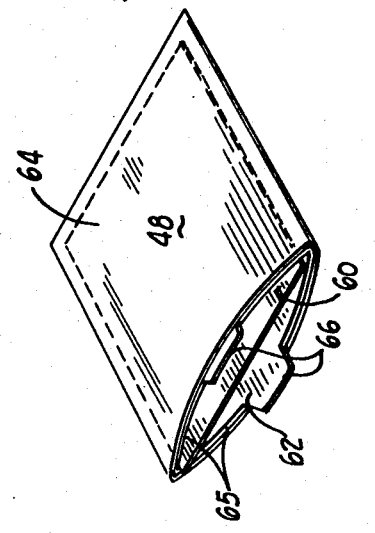

X-RAY FILM CHANGER FOR THE SERIAL RADIOGRAPHY

This is a division of application Ser. No. 818,823 filed July 25, 1977, now abandoned, which in turn was a division of application Ser. No. 617,102 filed Sept. 26, 1975 now U.S. Pat. No. 4,082,956 of Apr. 4, 1978.

BACKGROUND OF THE INVENTION

The present invention relates generally to serial radiographic systems and more particular to an improved X-ray film changer and method for storing and transporting X-ray film packs.

In serial radiography, a series of radiographs are produced by sequentially feeding a series of X-ray films, one at a time, to an exposure station. The exposure station is aligned with a source of X-rays which directs a beam of X-rays through the exposure station for exposing the films.

High-speed X-ray systems expose films at frame rates of up to six per second. High speed in radiography is desirable not only for minimizing the duration of the examination during which the patient must be immobile, but more importantly, for assuring that a timely exposure will accurately record an event of short duration.

Certain vascular studies are examples of medical diagnostic techniques which require high-speed exposures at high frame rates. With such a study a fluid which is relatively opaque to X-rays is injected into a patient's blood stream. Rapid sequence radiographs produce diagnostically useful information about the patient's blood vessels. This radiographic sequence must be rapid because the opaque material passes very quickly through that portion of a patient that is under investigation.

This high-speed requirement has posed problems in developing an optimized system. Such a system should be characterized: (a) by a minimum of system vibration, (b) by a minimum of noise, (c) by a "see through" exposure station allowing unobstructed fluoroscopy, (d) generally as an efficiently compact system which does not require expensive and bulky vacuum generating apparatus or mechanisms for opening evacuated pouches, (e) by assurance that there is intimate film contact with a pair of intensifying screens which usually accompany the film, and (f) avoiding any possibility of a film being scratched or otherwise damaged during transport or exposure.

One problem encountered in high-speed serial radiography has been the mechanism for insuring exposure of the X-ray film with the proper radiation energy level. The X-ray film generally has emulsion which is sensitive to both light and X-ray radiations on both surfaces of a substrate. In order to minimize patient exposure to radiation, a radiograph is typically made with a pair of light emissive intensifier screens in contact with the X-ray film. The intensifying screens emit light in response to impinging X-rays for exposing the film more quickly than it can be exposed by X-rays alone. Use of intensifying screens thus provides an increased intensity of electromagnetic radiation for exposing the X-ray film which reduces both the time required to produce the radiograph and the patient's exposure to X-radiation.

For maximum resolution the intensifying screens must be maintained in uniform intimate engagement with the film during X-ray exposure. With conventional radiographic procedure, an X-ray film and a pair of screens are inserted in a light-tight film container, known as a cassette. The cassette protects the X-ray film from exposure to light, dust and abrasions generated during handling of the film and is intended to maintain the intensifying screens in the required intimate contact with the film.

Initial proposals suggested use of springs and pressure plates in the cassette to maintain the intensifying screens in contact with the film. Later proposals suggested cassettes which utilized vacuum actuated pressure plates to eliminate the springs. More recently heat sealable, X-ray transparent pouches have been used for containing the film and the screens. The intensifying screens and X-ray sheet are inserted into a pouch and then the pouch is evacuated and sealed. Engagement of the film and screen is maintained by atmospheric pressure. Vacuum pouches which have been used successfully are described in detail in U.S. Pat. No. 3,348,042, entitled, FLEXIBLE LIGHT IMPERVIOUS FLUID TIGHT X-RAY FILM PACK, (here the FILM PACK patent) issued to Umberg, et al.

The evacuated, X-ray transparent pouch of the FILM PACK patent provided an improved and reliable cassette for holding the film and the screens in engagement. While the pouches have enjoyed outstanding commercial success, there are certain characteristics which become, when compared to the present invention, disadvantages. These include:

(a) The loading, evacuating and sealing of the pouches is relatively slow;
(b) Auxiliary equipment is required for generating the vacuum;
(c) The pouches are not reusable after the film has been exposed because the bags must be cut open to remove the exposed film for processing; and,
(d) When made for use with a film changer the pouches are both bulky and heavy. The bulk and weight of the pouches makes the transport of pouches to and from an X-ray room relatively difficult.

A serial radiographic system adapted especially for using film cassettes of the evacuated pouch type is described in U.S. Pat. No. 3,560,743, entitled, X-RAY FILM CHANGER HAVING A STORAGE CHAMBER WITH A WALL WHICH PIVOTS AS CASSETTES ARE FED THERETO, (here the FILM CHANGER patent) issued to Smit, et al. The FILM CHANGER patent discloses and claims a film changer which has a loading magazine positioned under an X-ray source. In use, a plurality of the vacuum sealed pouches are stacked in the loading magazine. After the film in the top cassette is exposed, the cassette is stripped from the stack to allow exposure of that film in the next underlying cassette. Each pouch has, in addition to the sheet of X-ray film and the intensifying screens, a lead backing sheet and a filler sheet. The backing sheets prevent exposure of the underlying film sheets when the top film sheet is exposed.

Film changers of the type described in the FILM CHANGER patent have proven to be reliable and acceptable, but when compared to the changer of this invention, they have inherent disadvantages. The lead backing sheets are relatively heavy and increase the mass of the film cassettes. The heavier film cassettes require a heavier, more massive system for stripping a cassette with an exposed film from the load magazine.

The lead backed cassettes are also bulky requiring relatively large supply and collection magazines.

Another disadvantage of most prior changes is that they have been noisy. Noise in a radiographic system is highly undesirable especially with a high-speed changer. A sick patient may suffer discomfort due to pain or an unstable emotional state. Undue noise during an examination may aggravate the patient's discomfort especially where his head is positioned adjacent the changer for cranial studies.

A design goal of recent radiographic systems also has been the achievement of a system which provides the capability optionally to conduct fluoroscopic studies of a patient. Some high-speed film changer designs did not allow both a fluoroscopic study and a radiographic study. One such system was the film changer described in the FILM CHANGER patent where the supply magazine for storing cassettes with unexposed film was located directly behind an exposure station. This location of the loading magazine prevented use of an image tube behind the exposure station.

Another serial radiographic system attempted to provide fluoroscopic capability by offsetting its film supply from its exposure station and providing an image tube behind the exposure station. Radiographs were made by transporting sheets of X-ray film in sequence from the supply to the exposure station where the film was clamped between a pair of intensifier screens mounted at the station.

With some of these systems fluoroscopic operation was somewhat limited by apparatus which was required for mounting the intensifier screens since such apparatus could, to some extent, obstruct the X-ray path. More importantly, since the intensifier screens absorb radiation and since the screens are between the X-ray source and the image tube, they function as filters and, as a consequence, fluoroscopic radiation levels are needlessly high.

SUMMARY OF THE INVENTION

The above noted and other disadvantages of the prior art are overcome by the present invention. An improved serial radiographic system constructed in accordance with the present invention has full fluoroscopic "see through" capability, does not require auxiliary vacuum generating apparatus, and allows reuse of the X-ray film pack container. The system is programmable for providing radiographs at a selected one of several high-speed rates and has control apparatus for providing reliable transportation of the X-ray film and prevents jams in the event of power failure. The system is constructed to provide minimum spacing between the patient and the X-ray film during radiographic operation and minimum spacing between the patient and an image tube during fluoroscopic operation.

The radiographic system made according to this invention has a source of X-rays which directs an X-ray beam towards an improved film changer. The improved film changer features an L-shaped housing having a cantilevered exposure station which underlies the X-ray source. The structure defining the exposure station is virtually free from X-ray absorbing material. A supply magazine and a receiving magazine are on opposite sides of the exposure station. The changer, including the magazines, is constructed to shield the contents of the magazine from scatter radiation.

A stack of X-ray film packs, each containing a sheet of X-ray film to be exposed, is stored in the supply magazine. A transport and drive system sequentially transports the film packs from the supply magazine to the exposure station at high speed. After exposure the film packs are transported to, and deposited in, the receiving magazine. The transport and drive system concurrently delivers an unexposed pack to the exposure station and an exposed pack to the receiving magazine.

The supply and the receiving magazines are removable and are light-tight when removed. The changer has magazine mounting tracks for facilitating insertion and removal of the magazines into and from the changer. This permits loading and unloading of the film packs to and from the respective magazines at locations from the respective magazines at locations remote from the radiographic system. Remote loading not only obviates the possibility of accidental exposure, but also, with extra magazines, permits optimized utilization of a changer.

As another feature, the receiving magazine is supported in a cantilever fashion from the structure defining the exposure station. Accordingly, removal of the receiving magazine substantially shortens the overall dimensions of the film changer and facilitates patient preparation by allowing the attendant easier access to the patient during preparation. Furthermore, because the changer is mobile, shortening of the dimensions by removal of the receiving magazine facilitates movement of the changer.

An outstanding feature of the present invention is the novel film pack which is used in combination with the changer. The pack utilizes an X-ray transparent, partially sealed, reusable pouch. The pouch contains a sheet of X-ray film and a pair of intensifying screens. The pouch has an unsealed edge portion through which the film and the screens may be inserted and removed. A folded sheet of X-ray transparent material is provided to support the film and screens which are placed in the fold. The ends of the folded sheet extend from the pouch to form centrally located, position orienting, tabs which insure proper orientation of the pouches in the receiving magazines. Filler material is also provided in the fold to give the film pack overall uniform thickness.

The transport system acts on the partially sealed pouch to expel air from it and to effect a temporary seal of the pouch during exposure. Accordingly, in addition to permitting pouch reuse, the need for presealing and pre-evacuating equipment is eliminated. In addition, since the pouches are reusable and are not permanently sealed, the need for slicing apparatus for opening pouches is also eliminated.

Another feature of the present invention is the transport and drive system for transporting the film packs in timed sequence from the supply magazine to the exposure station and from the exposure station to the receiving magazine. The transport and drive system provides harmonic output motion from constant speed input motion and provides dwell times of preselectable durations between output motions. The selectable dwell feature allows a film being exposed to be retained in the exposure station for a time duration appropriate for a selected exposure.

The transport mechanism has a pair of evacuator pinch rolls disposed transversely of a pouch feed path for engaging and squeezing opposite sides of the pouch as the film pack is transported into the exposure station. The evacuator rolls expel air from the pouch and cause uniform engagement of the screens with the film by pressing them into tight, intimate contact and creating a partial vacuum within the pouch. The rolls then clamp the unsealed edge portions of the pouch in releasably sealing contact during X-ray exposure of the film. This clamped contact maintains the vacuum and consequently the engagement of the film and screens.

The transport system also has a pair of ejector rolls positioned transversely of the pouch feed path between the exposure station and the receiving magazine. The ejector rolls have spaced rubber gripping members which grip the pouch only along its marginal portions. Gripping only along the marginal portions allows the position orienting tabs of each pouch to pass through the ejector rolls without being gripped. This insures that the ejector rolls will release exposed film packs before an unexposed film pack is fed into the exposure station and roll motion is stopped. The ejector rolls impart sufficient kinetic energy to the exposed film packs during extraction from the exposure station to insure the film packs will be received into the receiving magazine when the film changer is in an upstanding position during biplane studies.

The drive system preferably comprises a motor driven flywheel, a transmission which is selectively driven by the flywheel, and a brake and clutch arrangement. The flywheel rotates constantly, storing energy from the motor at times when pouches are not being fed. The flywheel is connected to the transmission by the brake and clutch arrangement. The transmission generates harmonic output motion from the substantially constant speed input motion from the flywheel. Use of the harmonic output motion is an outstanding feature which allows feedback into the flywheel of the kinetic energy from decelerating film packs and decelerating components of the transport mechanism, thereby conserving energy. Selective actuation of the brake and clutch mechanism provides the feature of adjustable film dwell time in the exposure station by periodically coupling and decoupling the flywheel to the transmission.

Another feature of the present invention is the novel supply magazine for providing, during each feed cycle, a single X-ray film pack from a stack of film packs stored in the supply magazine. The supply magazine comprises a light-tight container. The magazine has a slot adjacent an upper, inner surface. A thin flat plunger is provided for advancing a pouch through the slot.

A film supporting platform and an elevator mechanism are provided for supporting and elevating the stack of X-ray film packs. The elevator mechanism elevates the film supporting platform for positioning the uppermost film pack and for causing an upward bias of the stack of film packs against upper surfaces of the magazine. The plunger is slidable towards the slot and is adapted to engage the uppermost film pack to advance it towards the slot.

The elevator mechanism has a lift mechanism which features an elevator carriage positioned between the film support platform and the bottom or floor of the magazine. The carriage has a plurality of rollers disposed adjacent its sides. Pairs of ramps are mounted on the film support platform and on the floor of the magazine. The ramps engage the carriage rollers. The floor ramps are positioned for elevating the rollers and the platform ramps which, in turn, are for elevating the platform upon movement of the carriage in a first direction longitudinal of the ramps. An air cylinder supplies a constant bias to the carriage in the first direction for effecting the upward bias of the stack and of the uppermost pouch against the top of the magazine regardless of the number and thickness of the pouches.

A pressure release and shooting mechanism cooperates with the elevator mechanism for removing the upward bias and for causing advancement of a film pack. Periodically the mechanism pushes the carriage in a direction opposite the first to overcome the pressure from the air cylinder and to release the upward bias. The mechanism then causes the plunger to reciprocate while the upward bias is released to advance the uppermost film pack towards the slot.

The pressure release and shooting mechanism comprises a cam shaft having a pair of cams which periodically rock a pair of pivotally supported cam follower levers. One of the levers acts on the plunger while the other of the levers operates a release assembly for pushing the carriage in the opposite direction.

The release assembly includes a slidable, directional locking subassembly which cooperates with a rod pivotally connected to the carriage. The rod is unidirectionally gripped by the directional lock assembly for periodically displacing the carriage against the action of the air cylinder to release the upward bias.

Another outstanding feature of the invention is a control mechanism which cooperates with the pressure release and shooting mechanisms for selectively enabling feed of film packs from the supply magazine into the exposure station during normal operation of the changer. Only upon operation of the control mechanism is film feed enabled. This feature insures that the film pack which is in the exposure station (1) during the last scheduled radiograph, (2) during biplane studies requiring exposure in a pair of film changers during alternate machine cycles in each changer, or (3) upon a power failure is removed from the exposure station without being replaced with another film pack.

The control mechanism includes a solenoid and a latch which is selectively operated by the solenoid. The latch is coupled to the cam follower levers for securing them in disengagement from the cams so that the plunger and the release assembly are disabled unless the solenoid is actuated. The solenoid is actuated according to a program preselected by the operator of the film changer to release the cam follower levers during each machine cycle that film feed is desired.

Another feature of the radiographic system is the see-through exposure station which is free of X-ray absorbing material. The exposure station is, in part, defined by a pair of X-ray transparent plastic positioning sheets. These sheets are mounted above and below the exposure station for facilitating positioning of the film packs. The sheets are dish-shaped and apply a slight compressive force to the film packs during a radiographic exposure. The positioning sheet mounted above the film provides part of the patient-supporting surface of the cantilever housing and allows the patient to be positioned immediately adjacent the film packs. This sheet also has provision for securing a stationary grid for absorbing scattered radiation.

An image intensification tube is mounted underlying the positioning sheets. Only the positioning sheets are between the X-ray tube and an input window of the image tube. Accordingly, this construction provides fluoroscopy through the exposure station with minimal X-ray dosage to the patient. Furthermore, because the system allows unobstructed fluoroscopy, the patient may be prepared for radiography using the fluoroscopy and radiographs can then be taken without additional movement of the patient or components of the system. Because the image tube is immediately adjacent the exposure station, the image tube accurately provides an indication of the radiographic exposure area. Because the tube underlies the exposure station, it does not interfere with the radiography.

The positioning sheets are spaced from one another by a distance which is less than the thickness of the loaded film pack. This insures that the sheets apply pressure over the entire lateral surface of the pouch for assisting in the maintenance of the intimate engagement of the film and the intensifying screens within the pouch. Friction between the screens and the moving pouch is minimized by a thin layer of air which is trapped between the pouch and the sheets. This air layer provides air-film lubrication, and also allows atmospheric pressure to assist in compressing the evacuated pouch.

It is, accordingly, an object of the present invention to provide a novel and improved X-ray film changer and method of making radiographs.

BRIEF DESCRIPTION OF THE DRAWINGS

FIGS. 3a and 3b respectively are a perspective view of an X-ray film pack having a partially enclosed pouch and a cross-sectional view of the film pack for use with the changer of FIG. 1;

DETAILED DESCRIPTION OF A PREFERRED EMBODIMENT

General Arrangement

Figures 1, 2:
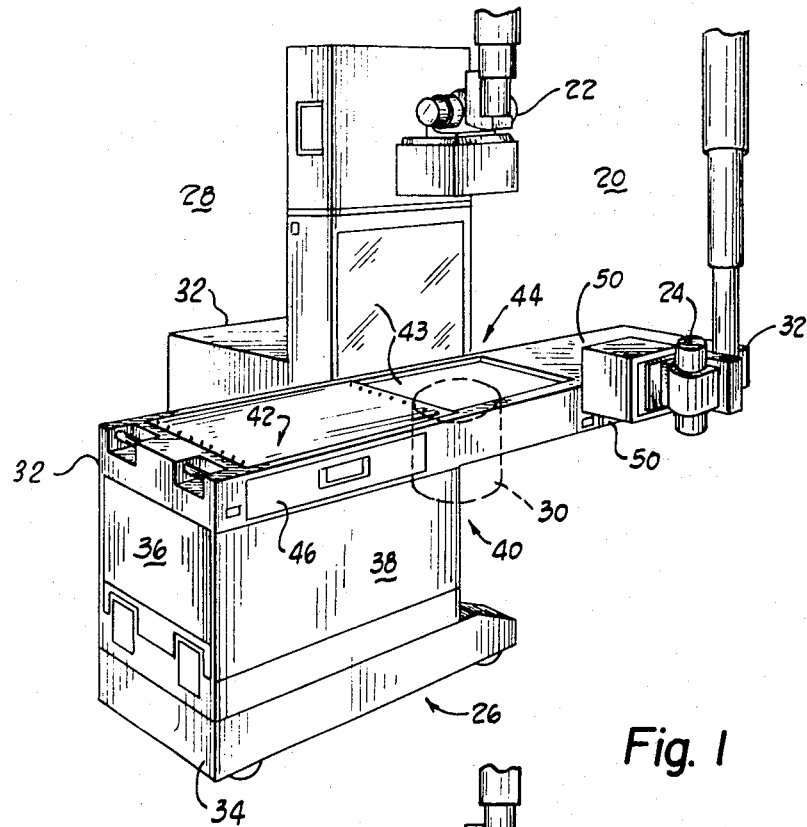
FIG. 1 is a diagrammatic perspective view of a serial radiographic system having a pair of film changers according to the invention.
FIG. 2 is a front view of one of the film changers of FIG. 1 showing components of the film changer in phantom outline.

The general appearance of a serial radiographic system 20 constructed in accordance with the present invention is shown in FIG. 1. A dual radiographic system is shown having a pair of X-ray tube heads 22, 24 and a pair of film changers 26, 28 disposed for receiving X-rays from tubes within the respective heads 22, 24. In use, the changers are connected to a controller (shown functionally in FIG. 2), such as, and including a suitable card reader, for programming the operation.

The dual radiographic system, including the controller, allows biplane studies which provide radiographs of a patient in both horizontal and vertical directions; that is, both so-called lateral and A-P (anterior-posterior) exposures. The controller typically responds to inputs from the operator for controlling: (a) the mode of operation (radiography or fluoroscopy), (b) the number of radiographs to be taken, (c) the time delay between radiographs, (d) the exposure time, and (e) the operation of an injector to inject substances which are opaque to X-radiation into the patient. Because the construction and operation of the film changers 26, 28 is similar, only a detailed description of the changer 26 will be set forth.

The components of the film changer 26 are contained within a housing structure 32. The structure 32 is composed of suitable metal plates and connecting members which provide a rigid shell structure. The housing structure is supported on a transportable base 34.

A set of panels 36 and 38 are provided on the ends of the housing structure 32 for allowing access to the components of the film changer. The housing structure 32 includes a central unit 40 having an upper surface 42 extending in cantilever fashion from the unit 40. The surface 42 has an opening closed by an X-ray transparent insert 43 in the cantilevered section. The insert 43 is under the X-ray tube head 22 and, in part, defines an exposure station 44. The insert 43 includes a pair of spaced but coacting sheets which function as positioning sheets for a pouch in the station 44.

An image intensification tube 30 is shown positioned under the insert 43 of the exposure station 44. As a feature of the invention, the construction of the changer 26 allows the tube 30 to be abutted against the positioning sheets for minimizing the space between it and a patient under observation. The image tube 30 is coupled to display apparatus (not shown) for fluoroscopic viewing of a patient.

Referring now to FIG. 2, a removable supply magazine 46 is provided. As viewed in FIG. 2, the supply magazine is to the left of the exposure station 44. The supply magazine stores a plurality of unexposed X-ray film carrying film packs 48. These packs are fed sequentially to the exposure station 44 in a manner which will be described in greater detail.

A removable receiving magazine 50 is provided to the right of the exposure station 44 as viewed in FIG. 2. The receiving magazine receives the film packs 48 after their respective sheets of X-ray film have been exposed. The magazines 46, 50 are light-tight enclosures which are mounted on tracks (not shown) to facilitate their removal to a darkroom for loading and unloading.

The receiving magazine 50 has an upper surface which forms a part of the cantilever portion of the upper surface 42. After removal of the magazine 50, the patient is positioned on the upper surface 42 and readied for the radiographic study. For example, if a series of radiographs is to be taken of the patient's head, his head is positioned on the insert 43. Removal of the magazine 50 is an outstanding feature as it provides intimate access to the patient for positioning his head. After the patient is properly positioned, the receiving magazine 50 is then reconnected to the central unit 40.

Removal of the receiving magazine 50 also substantially shortens the overall dimensions of the film changer 26. Because the film changer 26 is portable, shortening of the dimensions by removal of the receiving magazine 50 facilitates movement of the changer.

A film pack transport system 52 is provided in the housing structure 32. During an operating cycle the transport system 52 concurrently transports an unexposed film pack 48 from the supply magazine 46 to the exposure station 44 and an exposed film pack from the exposure station to the receiving magazine 50. The transport system 52 accelerates and decelerates the individual film packs with harmonic motion. This permits pack transport to and from the exposure station 44 in timed sequence at rates allowing up to 6 exposures per second.

A drive system 54 is located behind the panel 36. The drive system provides harmonic feed cycle drive with intermittent dwell times for the transport system 52. The feed cycles are of uniform feed time durations but the dwell times are of selectable duration. Thus, the film packs are fed from the supply magazine 46 to the exposure station 44 in equal periods of time, while the dwell time during which a film is in the exposure station is selectable. Such a constant-feed, selectable-dwell feature provides minimized cycle times while accommodating individual studies requiring different time durations for exposure of the X-ray film.

In operation, a supply magazine 46 which had previously been loaded with a plurality of the film packs 48 in a darkroom is inserted in the housing 32. An empty receiving magazine is also inserted into the housing structure. The controller is programmed for the beginning of a feed cycle.

To initiate a feed cycle, the drive system 54 is actuated causing the transport system 52 to initiate feeding. Referring to the timing diagram shown in FIG. 12, the transport system feeds the selected film pack from the supply magazine 46 into the exposure station at time $t_0$. After a delay ($t_1-t_0$) to allow for settling of vibrations, there is a preselected time duration ($t_2-t_1$) sufficient for exposure by a beam of X-rays from the tube head 22. After a period ($t_3-t_2$) to insure completion of exposure the transport system then is activated (at $t_3$) to remove the film pack having the exposed sheet of film from the exposure station and to deposit it in the receiving magazine 50. A subsequent film pack having unexposed film is transported by the system 52 into the exposure station concurrently with the transfer of the exposed film to the receiving magazine 50.

If slow-speed operation (less than six exposures per second) is desired, power from the drive system 54 is selectively decoupled from the transport system to provide a period ($t_0-t_1$) of extended dwell. In addition to slowing the rate of exposure, slow-speed operation extends the period during which the film may be exposed.

In an alternate operation, at a time when radiographs are not desired, the X-ray beam from the source 22 passes through a patient positioned adjacent the exposure station to the image tube 30. The exposure station 44 allows virtually unobstructed passage of the X-ray beam to the underlying intensification tube 30. Apparatus (not shown) coupled to the tube 30 provides fluoroscopic image of the patient.

Because of the feature of unobstructed fluoroscopy, the film changer 26 provides the capability for the patient to be prepared for radiography and then radiographed without additional movement of the patient, of the fluoroscopic equipment, or of the radiographic equipment. More specifically, because the image tube 30 underlies the exposure station 44, it is able to provide unobstructed fluoroscopy without interferring with the radiographic procedure.

A PREFERRED FILM PACK

FIGS. 3a and 3b depict a preferred embodiment of the X-ray film pack 48 used in the film changer 26 of FIGS. 1 and 2. The film pack comprises a sheet 60 of X-ray film positioned between and adjacent a pair of intensifying screens 62. A support layer 63 is folded around the intensifying screens 62 to obtain rigidity and maintain uniform thickness. A partially sealed, plastic pouch 64 enclosingly covers the sheet of X-ray film 60, the intensifying screens 62 and the support layer 63. The pouch 64 has an unsealed edge portion 65 through which the sheet 60, the screens 62, and the layer 63 are inserted and removed.

The pouch 64 is preferably comprised of a light-opaque plastic material, such a polyethylene, coextruded with a thin layer of nylon or polyester for strength. The pouch 64 is preferably of a rectangular configuration with one of the shorter sides providing the unsealed edge portions 65.

A pair of tab members 66 extend from the unsealed edge portions 65. The tab members 66 are utilized by a film feed mechanism in the supply magazine 46 for advancing the film pack 48 out of the supply magazine 46 towards the transport system 52. The tab members also coact with complementary wall surfaces of the supply magazine to assure proper orientation of the film packs in the supply magazine.

A slightly exploded, cross-sectional view of the film 60, the screens 62, the support layer 63, and the pouch 64 is shown in FIG. 3b. The tab members 66 are shown extending from the pouch portion of the film pack 48. Another feature of the film pack 48 is the provision of substantially X-ray transparent filler material 61a, 61b, and 61c comprising part of the tab member and extending into the pouch 64 for providing the film pack 48 of overall uniform thickness. The filler material 61a is secured to the sides of the folded support layer 63 and is of combined thickness to compensate for the thickness of the pair of intensifying screens 62. The filler material 61b is secured to the filler material 61a and is of thickness to compensate for the thickness of the pouch 64. The filler material 61c is secured to the filler material 61a, and is of thickness to compensate for the thickness of the film 60.

The dimensions of the pouch 64 are selected to accommodate the screens 62 and the film 60. Standard sizes for the screen and film are 35 cm×35 cm and 35.5 cm×35.5 cm, respectively. For those dimensions of the screen 62 and the film 60, a pouch having dimensions 36.2 cm by 43.1 cm (excluding the tab members) is suitable. The combined height of the pouch, screens, and film is approximately 0.18 cm, with the thickness of the pouch being approximately 0.05 cm.

THE DRIVE SYSTEM 54

The drive system 54 is shown in FIGS. 2, 4a, 4b, and 5 and comprises a constant-output-speed motor 74 which drives a flywheel assembly 76. A brake and clutch mechanism 78 selectively couples a transmission 80 to the flywheel assembly 76. The transmission 80 is coupled to the transport system 52 for selectively providing drive power to the system 52 in accordance with operation of the brake and clutch mechanism 78.

The flywheel assembly 76 is a feature of the film changer transport system. The flywheel stores energy at times when film pouches are not being fed. Since each film pack 48 is transported during a fraction of the overall operational cycle, significant amounts of energy may be stored in the flywheel assembly 76. Not only is the energy being stored during the dwell times when the film is not being transported (when the transport system 52 is not loading the flywheel assembly), but energy is also being stored during deceleration of the film pack and components of the transport system 52. That is, the kinetic energy of the moving film pack and components of the transport system 52 is transmitted into the flywheel assembly 76 during deceleration due to the harmonic motion of the transmission 80. A smaller motor is accordingly able to supply the required amount of energy and fluctuations in the drive speed are minimized. Similarly, power surges due to sudden loading of the motor are minimized.

The drive motor 74 has a motor output shaft 110 which carries a motor pulley 112. The motor 74 drives the pulley 112 at a suitable speed, such as 1800 rpm. A flywheel drive belt 114 rides in the pulley 112 for driving the flywheel assembly 76.

The flywheel assembly 76 includes a flywheel 116 carried by a shaft 118. A flywheel drive pulley 120 is carried on the input side of the shaft 118 and is driven by the belt 114. The flywheel 116 is of sufficient mass and is driven at a speed sufficient to drive the transport system 52 with minimal system vibration.

The brake and clutch mechanism 78 selectively couples the substantially constant-speed output of the flywheel assembly 76 to the transmission 80.

For high-speed operation the brake and clutch mechanism 78 is disabled and the motion of the flywheel assembly 76 is continuously coupled to the transmission 80. In the slower speed mode the brake and clutch mechanism is selectively operated to provide the additional dwell time ($t_{-1}$–$t_0$ in FIG. 12). As a feature the brake and clutch mechanism 78 is only operated in the slow speed mode when the transport system is in dwell and providing no loading on the transmission 80. Accordingly, no load condition is being applied to the brake and clutch mechanism 78 during its actuation, substantially extending the life of the mechanism 78.

The shaft 118 is the input side of the brake and clutch 78. The brake and clutch mechanism 78 is a commercially available Warner EP 400 brake and clutch. The brake and clutch mechanism is a six volt system which is operated by a conventional booster power supply circuit (not shown) for increasing the switching time response when it clutches and brakes input motion to the input of the transmission 80. A film changer which is commercially available and which utilizes the brake and clutch is marketed by Picker Corporation under the Model Number CP420.

A pair of flywheel output pulleys 122, 124 and coordinating linkage are also mounted on the output side of the shaft 118. The flywheel output pulley 124 drives the transmission 80 via a transmission drive belt 126.

The transmission 80 intermittently provides harmonic output motion in response to the constant speed input motion from the mechanism 78. The harmonic transport motion is functionally shown in FIG. 12 between times $t_3$–$t_0$($t_3$–$t_{-1}$ if slow speed operation is ordered). In the preferred embodiment the overall period of motion is 125 milliseconds, with the peak of the harmonic motion intermediate the period $t_3$–$t_0$. The transmission 80 has an input pulley 128 carried by an input shaft 129. The input pulley 128 is coupled to the flywheel output pulley 124 by the transmission drive belt 126. The transmission 80 is a commercially available transmission, being an intermittent motion device sold by Camco Corporation under the name and model: Camco Parallel Index Drive No. 250-P2H20-270.

Transmission 80 has an output shaft 130 which carries a transport drive pulley 132. A belt 134 rides in the pulley 132 and couples motion of the shaft 130 to the transport system 52. For constant speed rotation of the input shaft 129, the transmission 80 produces harmonic output motion on the shaft 130. That is, for every complete rotation of the input pulley 128, the output shaft 130 rotates a predetermined fraction of a revolution at a controlled high acceleration and deceleration rates. For continuous rotation of the input shaft 129 at a 360 rpm rate, the output shaft 130 produces harmonic output cycles and dwelling periods at a rate of six per second. By stopping the input pulley 128 from rotating at the constant speed provided by the flywheel assembly 76 a selectably longer dwell time ($t_0$–$t_{-1}$ in FIG. 12) is provided between cycles of the output shaft 130.

A photoswitch 131 monitors the rotational position of the input shaft 129 of the transmission 80. The photoswitch 131 provides an input signal to a booster power supply circuit whenever a revolution of the input shaft 129 has been completed. The booster power supply circuit is under control of the controller and is selectively responsive to the input signal from the photoswitch for selectively actuating the brake and clutch mechanism to rapidly brake the input shaft 129 for a period of time determined by the controller if a lower operational speed is programmed.

In a high-speed mode of operation the booster circuit is nonresponsive to the input signal and input motion to the transmission is continuous. In the high speed mode the continuous motion of the input shaft 129 produces the six harmonic cycles per second of the output shaft 130. Each cycle results in exposure of a sheet of X-ray film during the transport dwelling times ($t_0$–$t_5$) and results in the depositing of an exposed sheet of film into the receiving magazine 50.

In slower speed operation, the controller conditions the booster power supply to respond to the input signal and to actuate the brake and clutch mechanism. The input shaft 129 is braked for a predeterminable time to produce a longer dwell between intermittent output motions of the shaft 130. This selective braking allows increased time for exposing each sheet of X-ray film when the slower frame-per-second rate is selected.

The photoswitch 131 also controls actuation of the X-ray tube head 22. The input signal from the photoswitch 131 triggers an X-ray tube head generator to actuate the tube head 22 after a 4.2 millisecond delay ($t_1$–$t_0$ in FIG. 12) sufficient to insure that the film pack is in the exposure station and motionless.

The combination of the flywheel assembly 76, the brake and clutch mechanism 78, and the transmission 80 is a feature of the film changer 26. The arrangement produces a selectable dwell duration which allows a selectable time for exposing each sheet of X-ray film. Additionally the arrangement minimizes system vibration and continuous drive power required by using a constantly rotating flywheel.

THE TRANSPORT SYSTEM 52

Referring to FIGS. 2, 4a, 6, 7, and 8, the transport system 52 is shown underlying the exposure station 44 and along a feed path from the supply magazine 46 through the station to the receiving magazine 50. The transport system includes pluralities of transport pinch rolls 135 and pinch rollers 136 driven by a transport drive mechanism 137. The pinch rolls 135 extend transversely across the entire feed path. The pinch rollers 136 are mounted on stub shafts along the feed path on opposite sides of the exposure station 44. The pinch rollers 136 extend only marginally inwardly to grip side portions of a transported pack without obstructing the exposure station.

Two of the pinch rolls 135 are evacuation rolls 138 which are specially configured to serve a dual purpose. The evacuator rolls serve both to transport the film pack 48 and to press and hold the sheet 60 of X-ray film and the pair of intensifying screens 62 in intimate and uniform engagement by vacuum while a radiograph is made.

The pinch rolls 135 also include a pair of loading magazine ejector rolls 140, and an exposure station ejector roll pair 142. All the pinch rolls and pinch rollers are journaled in the housing and frame structure 32.

As a film pack 48 is advanced from the loading magazine 46, it is grasped by the loading magazine ejector rolls 140 and fed through the evacuator rolls 138. The film sheet 60 and the pair of intensifier screens 62 are squeezed into uniform engagement, and the pouch 64 is vacuumized as it passes through the rolls 138. The pinch rollers 136 are idler rollers and maintain the periphery of the film pack in position as it is transported into the exposure station 44.

Figure 7:
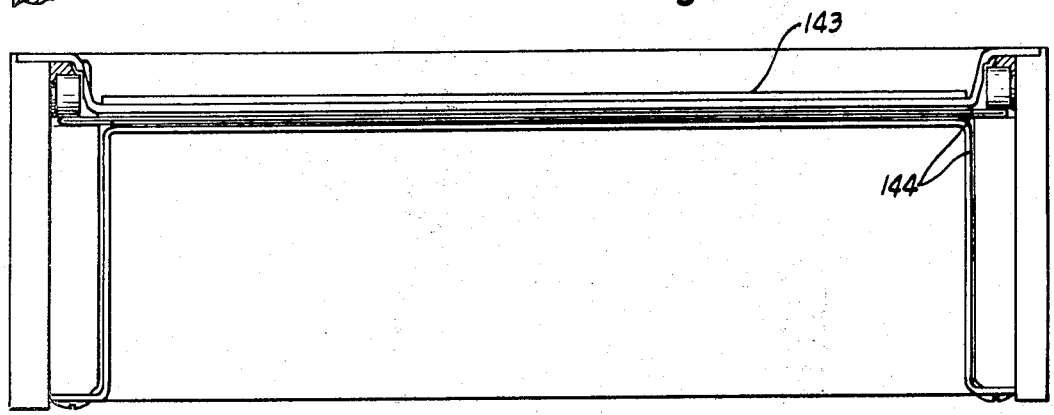
FIG. 7 is a cross-sectional view of the exposure station of the changer of FIG. 2.

As shown in FIG. 7, a pair of X-ray transparent, pack-positioning sheets 144 are provided in the exposure station 44 adjacent the peripheral rollers 136 for positioning the film packs. A plastic composition commercially available under the trade name LEXAN is a suitable material for the sheets 144. Preferably the sheets 144 are opaque to visible light.

The positioning sheets 144 are dish-shaped and have spaced, planar, exposure station portions. These portions each are of an area as large or larger than this area of the sheet of X-ray film 60. The exposure station portions are spaced to accept the evacuated unexposed film pack 48.

The exposure station sheets serves two important functions. The first function is, while maintaining contact drag of the film pack at an acceptable minimum level as it is transported to and from the exposure station, to provide stable positioning for the pouch 64 in the exposure station. The second function is, while the evacuated pouch is in the exposure station, to allow the pressure of ambient air over both faces of the pouch 64 to keep the pouch 64 compressed over the complete area of the film 60. The film 60 within the pouch 64 is larger than the actual exposure area, so the air pressure assures uniform opposed air pressure force over an area larger than the full exposure area. Accordingly firm intimate surface contact of the screens 62 and the film 60 in the pouch 64 is assured.

A scatter-radiation-absorbing grid 143 is secured within the dish of the upper positioning sheet 144. In the preferred embodiment, the grid 143 is secured to the upper positioning sheet 143 by a velcro fastener (not shown). The grid 143 absorbs scattered X-rays and accordingly assures a sharp image on each exposed sheet of film.

Because the grid 143 is separated from the film pack 48 by only the upper positioning sheet 144, the distance between the grid 143 and the film is minimized, assuring maximum benefit from the grid.

Figure 4A:
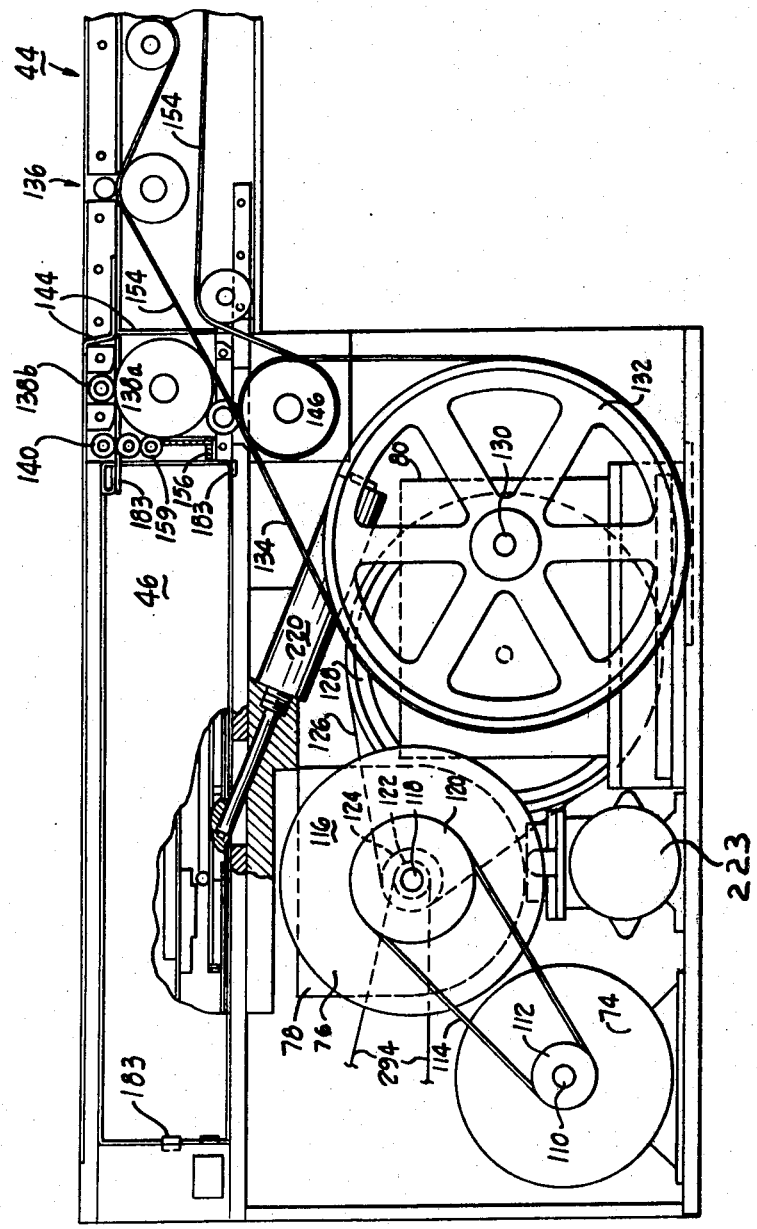
FIGS. 4a and 4b are side and top plan views of the drive, transport, and shooting mechanisms of the film changer in FIG. 2.
Figure 4B:
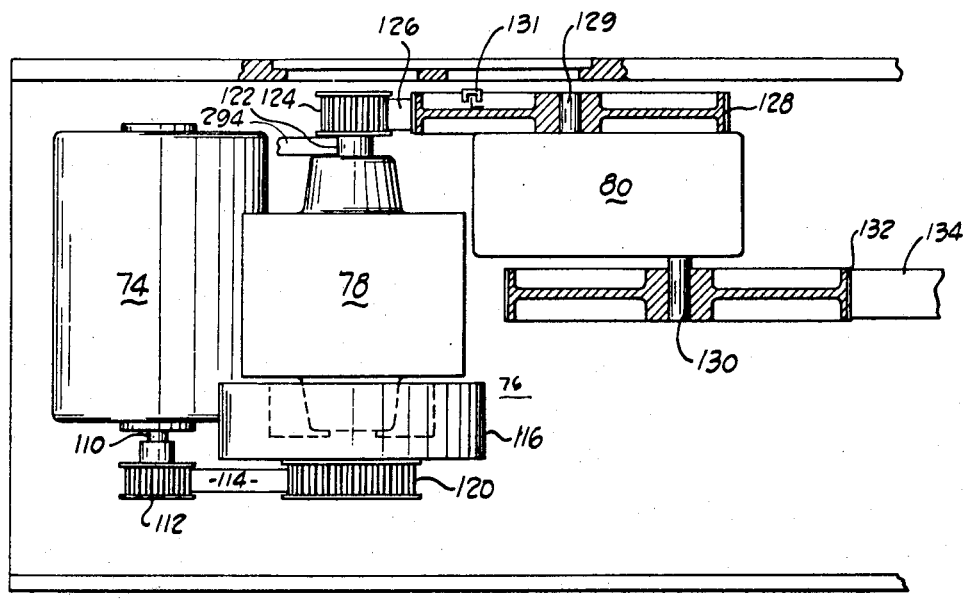
Figure 5:
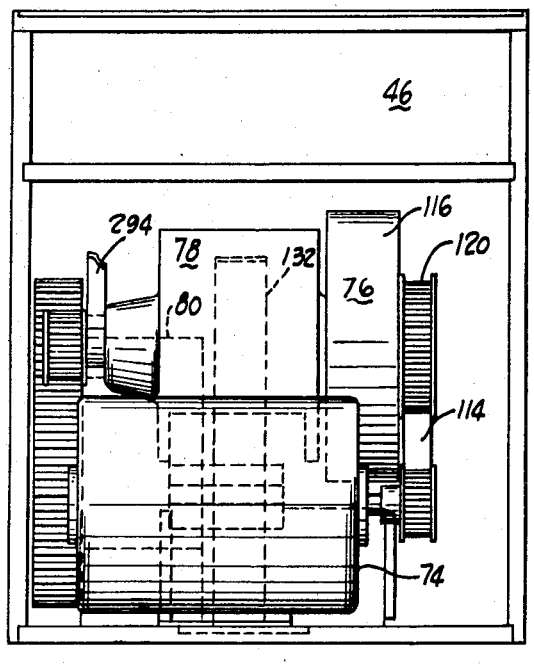
FIG. 5 is an end view of the drive mechanism in the changer of FIG. 2.
Figure 6:
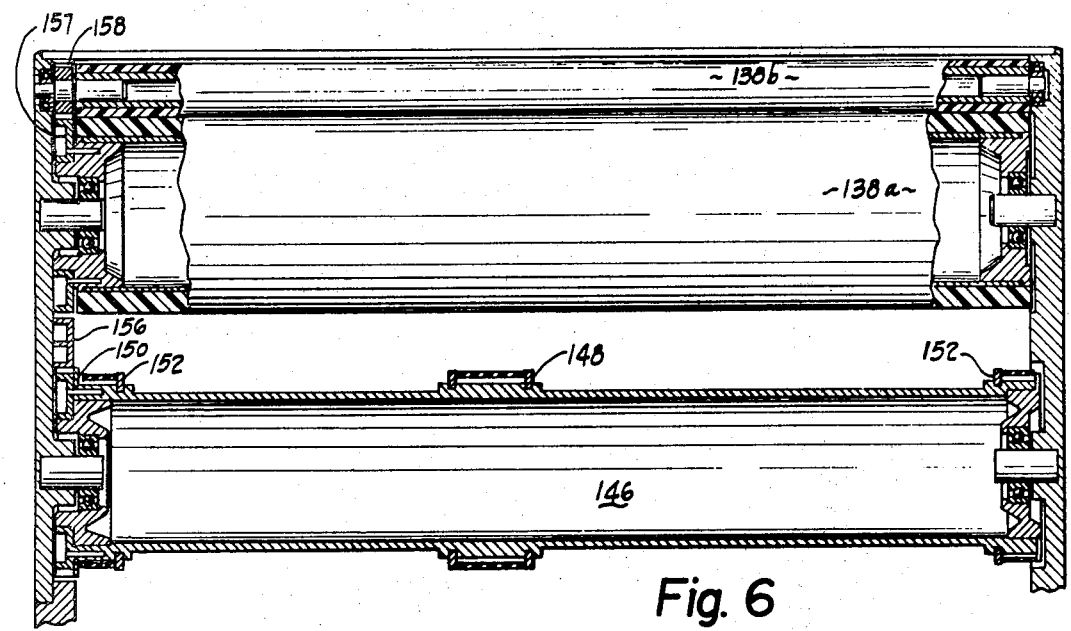
FIG. 6 is a cross-sectional view of the evacuator rolls in the changer of FIG. 2.

The transport drive mechanism 137 is illustrated in FIGS. 4a and 6. It comprises a primary drive roll 146 which carries a timing belt pulley 148, a ring gear 150, and a pair of timing belt pulleys 152. The primary drive roll 146 is journaled in the housing structure 32 and is driven by the belt 134 from the transport drive pulley 132. A set of timing belts 154 ride in the timing belt pulleys 152 for rotating the peripheral rollers 136. The ring gear 150 is pinned to the primary drive roll 146 and engage an idler gear 156 which drives the evacuator rolls 138.

The evacuator rolls 138 comprise a lower roll 138a and an upper roll 138b respectively having ring gears 157, 158. The evacuator drive gear 156 engages the ring gear 157 of the lower roll 138a which in turn engages the ring gear 158 of the upper roll 138b. Rotary motion of the primary drive roll 146 causes rotation of the evacuator rolls 138.

The evacuator rolls 138 have a coating of urethane material commercially sold under the trade name Persista by Livingston Kenhar of Brampton, Ontario. This material deforms with sufficient pressure to enable the evacuator rolls 138 to exhaust the air from the pouch 64 as it passes between the rolls. After the film pack 48 has passed through the evacuator rolls 138, the rolls 138a, 138b resiliently squeeze the unsealed edge portions 65 of the pouch into a temporary airtight seal.

Another idler gear 159 is journaled in the frame members and in contact with the loading magazine ejector rolls 140 and the evacuator rolls 138. Rotation of the evacuator rolls 138 rotates the idler gear 159 which rotates the ejector rolls 140 in the proper direction for feeding the film pack 48 to the evacuator rolls 138.

Figure 8:
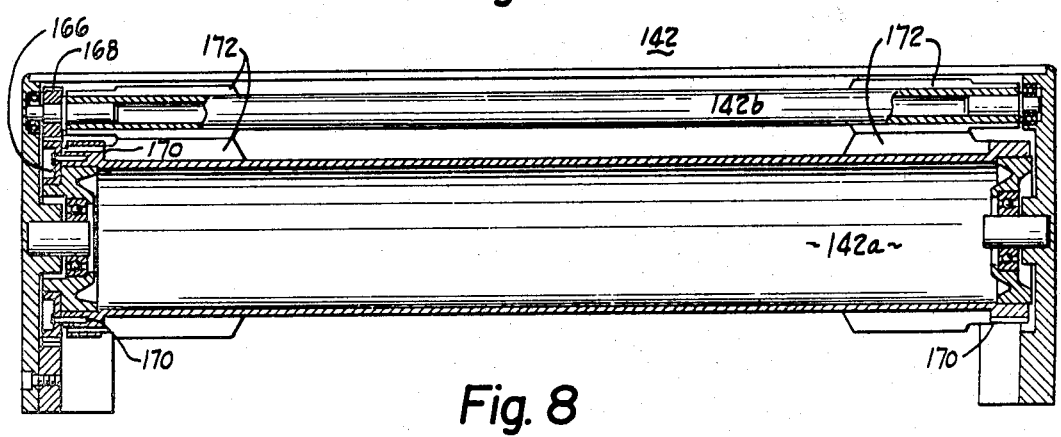
FIG. 8 is a cross-sectional view of the exposure station ejector rolls in the changer of FIG. 2.

FIG. 8 illustrates the exposure station ejector roll pair 142. The rolls are interposed between the exposure station 44 and the receiving magazine 50 for grasping the film pack 48 after exposure and for withdrawing it from the exposure station 44. The ejector roll pair 142 comprises a lower roll 142a and an upper roll 142b. The lower roll 142a has a lower roll ring gear 166 and a pair of belt pulleys 170. The upper roll 142b has an upper roll ring gear 168 which meshes with the lower roll ring gear 166. The pulleys 170 are driven by the timing belts 154 for rotating the ejector roll pair 142.

A plurality of gripping members 172 are circumferentially provided on each of the ejector rolls 142. The members 172 are composed of rubber and grip the film pack 48 as it is transported from the pair of peripheral rollers 136 for eventually depositing it in the receiving magazine 50. The gripping members 172 are laterally spaced from one another as a feature of the invention. The members 172 are spaced for gripping the film pack 48 only along the margins of the film pack 48, thereby allowing the tab members 66 to pass through the ejector rolls 142 without being gripped. This method of extracting the exposed film packs 48 from the exposure station assures that the ejector rolls 142 will release the exposed film packs prior to an unexposed film pack being fed into the exposure station (whereupon roll motion stops). The ejector rolls 142 impart sufficient kinetic energy to the exposed film packs as they are extracted from the exposure station to insure that the film packs will be received into the receiving magazine during all modes of operation of the changer 26. Specifically, sufficient kinetic energy is applied to insure that the exposed film pack will be deposited into the receiving magazine when the film changer is in an upstanding position during biplane studies.

The evacuator rolls 138 and the ejector rolls 142 are similarly constructed. Each upper roll 138b, 142b is of relatively small diameter, for example, 0.875 inches, and each lower roll 138a, 142a is of relatively large diameter, for example, 2.875 inches. The dimensions of and spacing between the rolls 138, and between the rolls 142 are determined in accordance with the size of the film pack 48, and to produce equal surface velocity on both surfaces of filmpack 48.

The drive system 54 includes a pressure release and shooting mechanism 174 which cooperates with the supply magazine 46 and a control mechanism 175 which controls operation of the shooting mechanism 174. The pressure release and shooting mechanism 174 is disposed at the end of the supply magazine 46 which is to the left as viewed in FIG. 2 and opposite the exposure station 44. The control mechanism 175 selectively conditions the pressure release and shooting mechanism 174 to initiate movement of the topmost film pack 48 during a feed cycle. As indicated schematically in FIG. 2, the drive system 54 drives both the pressure release and shooting mechanism 174 and the transport drive mechanism 137. To facilitate understanding of the mechanisms 174 and 175, they are described in detail after description of the supply magazine 46.

THE SUPPLY MAGAZINE 46

Figure 9A:
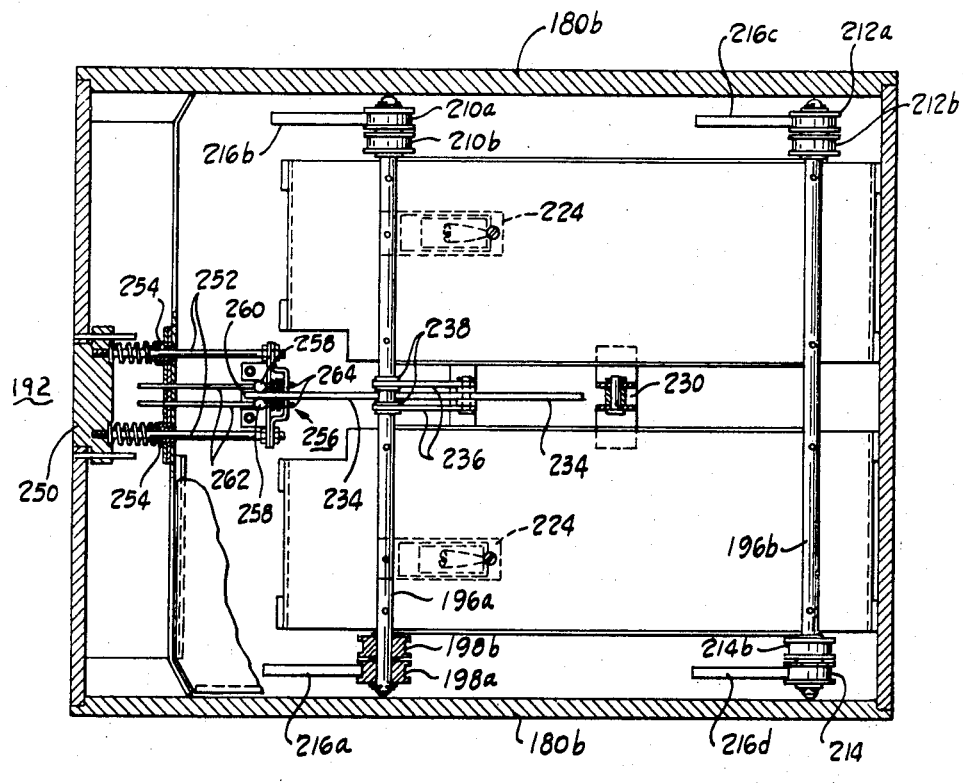
FIGS. 9a and 9b are plan and cross-sectional views of the loading magazine used in the changer in FIG. 1.
Figure 9B:
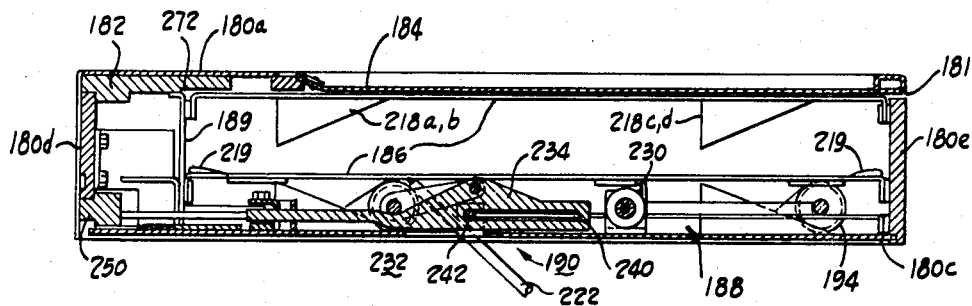

The supply magazine 46 is shown in detail in FIGS. 4a, 9a and 9b. The supply magazine 46 comprises a housing 180 having a top 180a, sides 180b, a floor 180c, a front 180d, and a back 180e. A slot 181 is formed between the back 180e and the top 180a through which a film pack 48 may pass. A thin, flat feed plunger 182 is provided adjacent the top 180a for advancing the uppermost film pack towards the slot 181.

The housing 180 is slidable on nylon tracks 183 which are fastened to the support structure of the housing 32. The tracks 183 allow the supply magazine 46 to be removed from the film changer 26 to enable convenient loading of unexposed film packs 48 in a darkroom. A hinged loading plate 184 is provided as the front part of the top plate 180a for the loading of the film packs into the housing 180.

A film-supporting platform 186 and an elevator mechanism 188 coupled to the platform 186 are within the housing 180. An inner wall 189 is provided between the front and back 180d, 180e for defining a light-tight passage for the film-supporting platform 186 and the elevator mechanism 188. The wall 189 also provides a complementary surface which coacts with the tab members 66 of the film packs 48 for assuring proper orientation of the pouches. The film-supporting platform 186 movably supports a plurality of the film packs 48 for raising and lowering the film packs under control of the elevator mechanism 188.

The elevator mechanism 188 comprises a lift mechanism 190 and lift control apparatus 250. The lift mechanism 190 comprises a carriage 194 having a pair of axles 196a, 196b, with the axles each having two pairs of rollers 198, 210, 212, 214, respectively. Outermost rollers 198a, 210a, 212a, 214a of each respective pair ride on four ramps 216a–216d which are mounted on the floor 180c of the housing 180. Innermost rollers 198b, 210b, 212b, 214b of each respective pair ride on four ramps 218a–218d which are mounted on the underside of the film-supporting platform 186. A set of spring members 219 is provided at each end of the carriage 194. The spring members 219 ensure that the tab member 66 of the uppermost pouch is engaged with the feed plunger 182, and ensures that the front of the uppermost pouch is level with the slot 181 when the elevator mechanism 188 lowers the film supporting platform 186.

The lift mechanism 190 further includes a pair of air cylinders 220. The air cylinders 220 each have a plunger 222 which engages a plunger receiving plate 224 attached to the carriage 194. An air pump 223 supplies air pressure to the air cylinder 220 to force the plunger 222 against the receiving plate 224. This urges the carriage 194 in a transverse direction towards the inner wall 189. Movement of the carriage 194 in the transverse direction towards the inner wall 189 forces the rollers 198a, 210a, 212a, 214a to roll up the ramps 216a–d which elevates the carriage 194. The rollers 198b, 210b, 212b, 214b roll up the ramps 218a–d and urge the film-supporting platform 186 upwardly until the uppermost film pack 48 is biased against the plunger 182.

The lift control apparatus is responsive to the pressure release and shooting mechanism 174 for controlling elevation of the film-supporting platform 186. The lift control mechanism 192 has a bias spring 230 and a pressure release assembly 232. The bias spring 230 is mounted to the floor 180c of the housing 180 for providing a force to the film-supporting platform 186 which opposes upward motion of the platform. The pressure release assembly 232 is provided for periodically overcoming the pressure supplied by the air cylinder 220 for removing the upward bias of the film-supporting platform 186. Removal of the upward bias allows the bias spring 230 to pull the film-supporting platform 186 towards the bottom sheet 180c. The pressure release assembly 232 overcomes the force from the air cylinder 220 by driving the carriage in the transverse direction away from the inner wall 189. The direction away from the inner wall 189 will hereafter be referred to as the "reverse" direction, and the transverse direction towards the inner wall 189 will be referred to as the "forward" direction. Further, the position of the air cylinder 220 which urges the carriage in the forward direction will be referred to as the "actuated" position of the air cylinder.

The pressure release assembly 232 comprises a bracket 234 slidably coupled to the floor 180c. The bracket 234 has a slot 240 cooperating with a stationary pin 242 mounted to the bottom sheet 180c and which acts as a bracket stop. The bracket 234 is coupled to the carriage axle 196a via a pair of metal links 236 which are pivotally mounted to the axle 196a via a pair of bearings 238. The bracket 234 moves in the forward and reverse directions according to travel of the carriage 194 under influence of the air cylinder 220.

The pressure release assembly 232 also comprises a locking subassembly which is coupled to the bracket 234. The locking assembly is slidable in the forward and reverse directions in response to the controlled movement of the pressure release and shooting mechanism 174. The locking subassembly comprises a plunger 250 adapted for receiving the movement of the pressure release and shooting mechanism 174, a pair of shafts 252 coupled through a pair of guides 254 to a unidirectional locking arrangement 256. The unidirectional locking arrangement 256 in one operating state allows uninhibited motion by the bracket 234, and in another operating state clamps the bracket 234 and urges it in the reverse direction for overcoming the pressure of the air cylinder 220.

The unidirectional locking arrangement 256 comprises a pair of wedging rollers 258 in a tapered slot 260. The rollers 258 are adjacent each side of an extension of the bracket 234 and are contained within the slot 260 by a pair of stops 262 and a pair of spring biased pins 264. When the unidirectional locking arrangement 256 is in its extreme position in the forward direction, the rollers 258 rest against the stops 262 and are prevented from wedging within the tapered slot 260; movement of the bracket 234 in either the forward or the reverse directions is thus uninhibited. When the unidirectional locking arrangement 256 is displaced in the reverse direction, the rollers 258 wedge within the tapered slot 260 and tightly clasp the bracket 234. Additional travel of the unidirectional locking arrangement 256 in response to the pressure release and shooting mechanism 174 forces the carriage 194 in the reverse direction to overcome the pressure from the air cylinder 220.

The feed plunger 182 is responsive to the shooting mechanism 174 for feed movement of the uppermost film pack 48 on the film-supporting platform 186. The plunger 182 has a notched end portion 272 for catching the stripping the uppermost film pack and propelling it towards the slot 181. The plunger 182 travels a relatively short distance at high acceleration and deceleration.

THE PRESSURE RELEASE AND SHOOTING MECHANISM 174

Figure 10A:
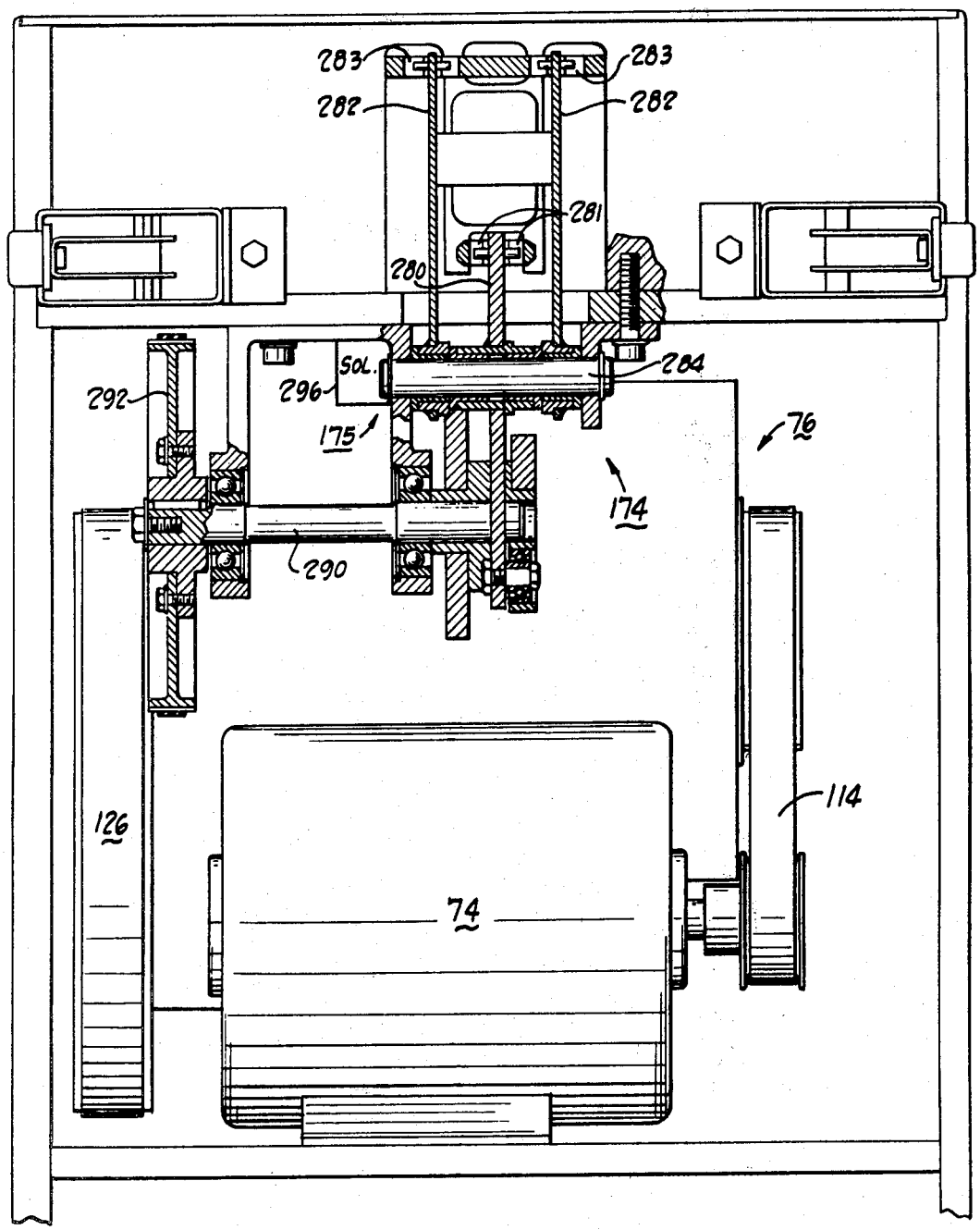
FIGS. 10a and 10b are side and end views of the changer of FIG. 1, showing cross-sections of the shooting mechanism.
Figure 10B:
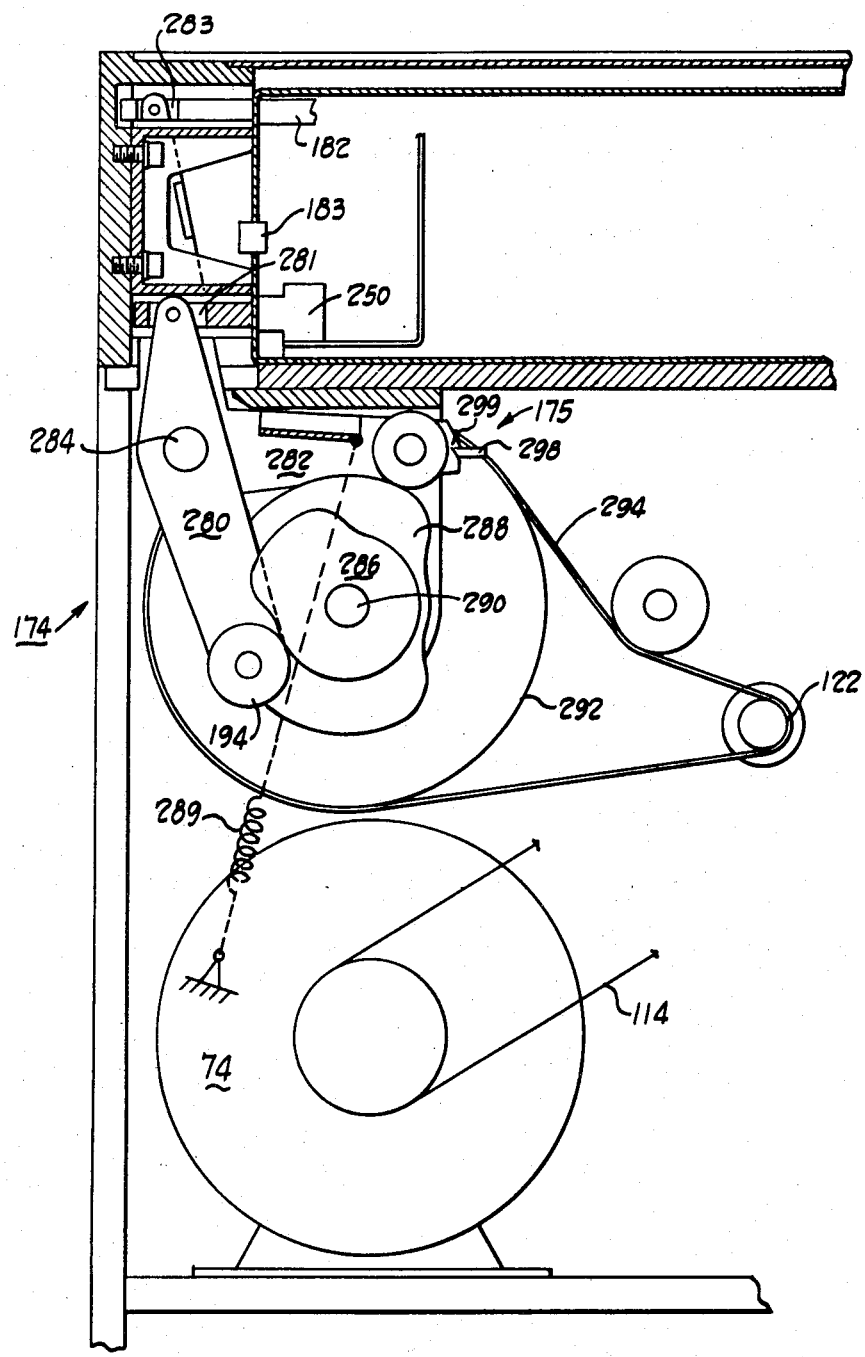

The pressure release and shooting mechanism 174 is shown in detail in FIGS. 10a and 10b. It is dual cam operated for sequentially actuating the pressure release assembly 232 and for reciprocating the feed plunger 182 to initiate feed movement of the uppermost film pack 48 through the slot 181. The mechanism 174 comprises a pressure release cam follower lever 280 and a pair of commonly connected feed actuator levers 282 which are pivotally mounted to a pivot shaft 284. The pressure release lever 280 is coupled to the pressure release plunger 250 via a pressure release rod 281. The feed actuator lever 282 is coupled to the feed plunger 182 by feed actuator rod 283. The pressure release rod 281 and the feed actuator rod 283 reciprocate in the forward and reverse directions for respectively actuating the pressure release plunger 250 and the feed plunger 182.

The levers 280, 282 follow a pressure release cam 286 and a feed actuator cam 288 respectively. The cams 286, 288 are mounted on a cam shaft 290 which is journaled to the frame members of the housing structure 32. A spring 289 is connected to the lever 282 and to the housing structure 32 for applying pressure to the lever 282 for urging it to follow the cam 288.

The pressure release lever 280 is displaced by a lobe on the pressure release cam 286. The lobe is of circumferential duration sufficient to cause release of upward pressure on the carriage 194 for a time period sufficient to allow reciprocation of the feed plunger 182 and to allow the uppermost film pack to be freely extracted from the supply magazine by preventing the elevator mechanism 188 from reapplying the upward pressure.

The feed actuator lever 282 is displaced by a flat on the feed actuator cam 288. The flat on the feed actuator cam 288 is in relationship with the lobe on the pressure release cam 286 to cause reciprocation of the feed lever 182 while the upward pressure is released. Reciprocation of the feed lever 182 strips the uppermost film pack 48, and advances it towards the slot 181.

The cam shaft 290 carries a cam shaft pulley 292 which is driven by a belt 294. The belt 294 couples motion from the flywheel output pulley 122 to the cam shaft 290 as controlled by the brake and clutch mechanism 78.

Operation of the pressure release and shooting mechanism 174 is as follows. After the flywheel 116 is rotating at operating speed, the flywheel output pulley 122 and the belt 294 causes the cam shaft 290 to rotate. The pressure release lever 280 is rocked by the lobe on the pressure release cam 286 via cam follower roller 194 for advancing the plunger 250 and causing release of the upward pressure on the stack of film packs 48. The springs 219 insure proper alignment of the uppermost pouch for stripping of the uppermost pouch. While the upward pressure is released, the feed actuator cam follower lever 282 is displaced by the flat on the feed actuator cam 288 and advances the feed plunger 182. The feed plunger rapidly reciprocates, catching the uppermost film pack by the notched end portion 272 for advancing it towards the slot 181. After the reciprocation of the feed plunger 270, the lever 280 rolls off the lobe of the cam 286, allowing upward bias of the film supporting platform 186 to be restored.

Referring to FIGS. 10a and 10b, the control mechanism 175 includes a solenoid (schematically illustrated at 296 in FIG. 10a) and a latch mechanism (schematically illustrated at 298 in FIG. 10b). The latch mechanism 298 is selectively engageable with the feed actuator cam follower lever 282 for selectively holding the cam follower lever 282 in disengagement from the feed actuator cam 288. The latch 298 slides in an apparatus (not shown) and is operated by the solenoid 298. When the solenoid is in an unactuated state, the latch mechanism 298 is in engagement with a notch 299 for preventing feeding of the film packs 48 from the supply magazine. Only upon actuation of the solenoid 296 is the cam follower lever 282 allowed to follow the cam 288 to thereby cause feeding of the film packs 48.

The system controller is programmed to operate the solenoid 296 every machine cycle that feed other film packs into the exposure station is desired. This is represented in FIG. 12 by a high value of a solenoid signal $S_1$. Conversely, this feature ensures that the film pack in the exposure station during the last scheduled radiograph is not replaced by an unexposed film pack. Also the control mechanism is advantageous during biplane studies which often require alternate exposures in a pair of film changers as shown in FIG. 1. For example, often a first radiograph is desired during one cycle in the film changer 28, and the next radiograph is desired during the next machine cycle in the film changer 26. Prior techniques required concurrent operation of both film changers with alternate film packs in each changer being a dummy film pack. The alternate sequence was staggered in each changer so that, hopefully, the desired sequence of alternate exposures was accomplished. Occasionally, however, the staggering and the placement of the dummy film packs was improper and the desired sequence was not accomplished, requiring a repeat of the sequence.

The control mechanism 175 obviates this possibility by operating the solenoid 296 according to preprogrammed control in the system controller.

The control mechanism 175 is also advantageous in that it prevents improper film transport upon power failure to the system. Because the solenoid 296 must be actuated before film feed, if a power failure occurs, the solenoid is not actuated, and there can be no film feed. Because of the momentum of the system, any film pack previously in the exposure station is extracted, thereby assuring that no film pile up will occur upon the first machine cycle after a power failure.

Operation of the solenoid 296 is exemplified by the timing diagram of FIG. 12. If a film feed is desired for a particular machine cycle, the solenoid signal $S_1$ is generated prior to time $t_0$ and is maintained until after the beginning of the transport cycle time $t_3$.

THE RECEIVING MAGAZINE 50

Figure 11A:
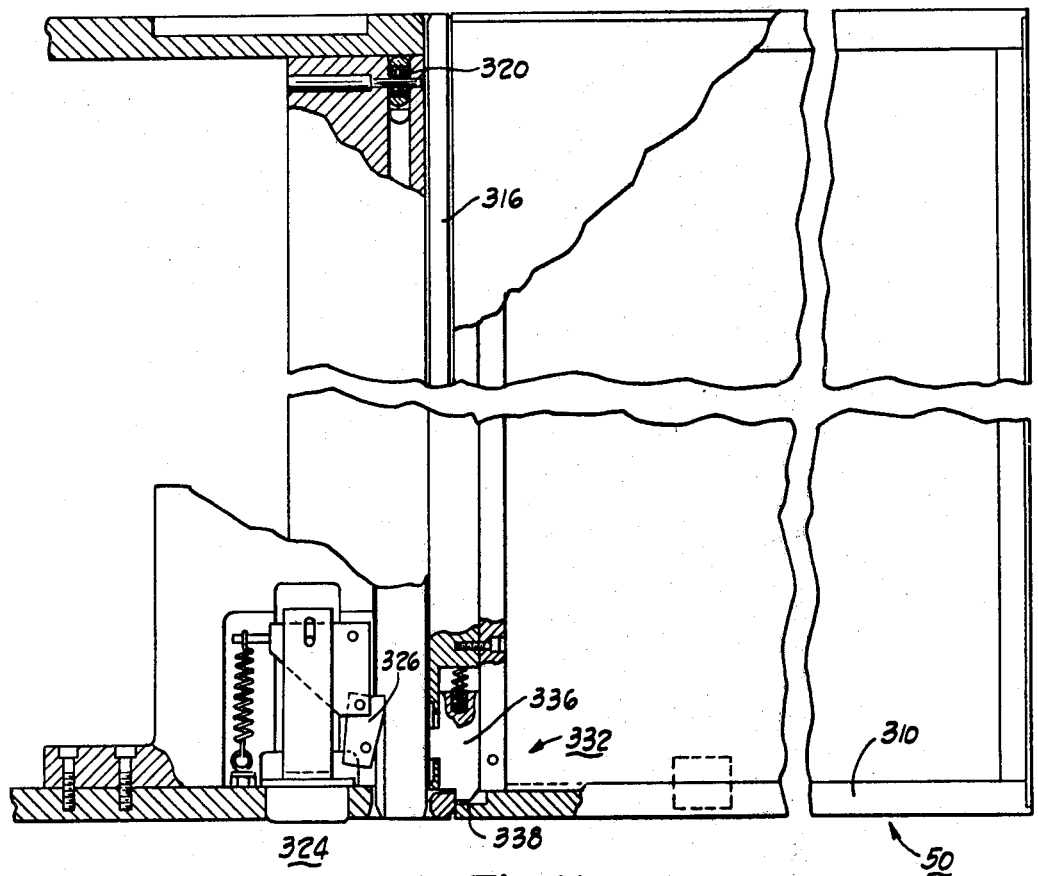
FIGS. 11a and 11b are plan and cross-sectional views of the receiving magazine used in the changer of FIG. 1; and, FIG. 12 is a timing diagram showing operation of one cycle of the changer of FIG. 1.
Figure 11B:
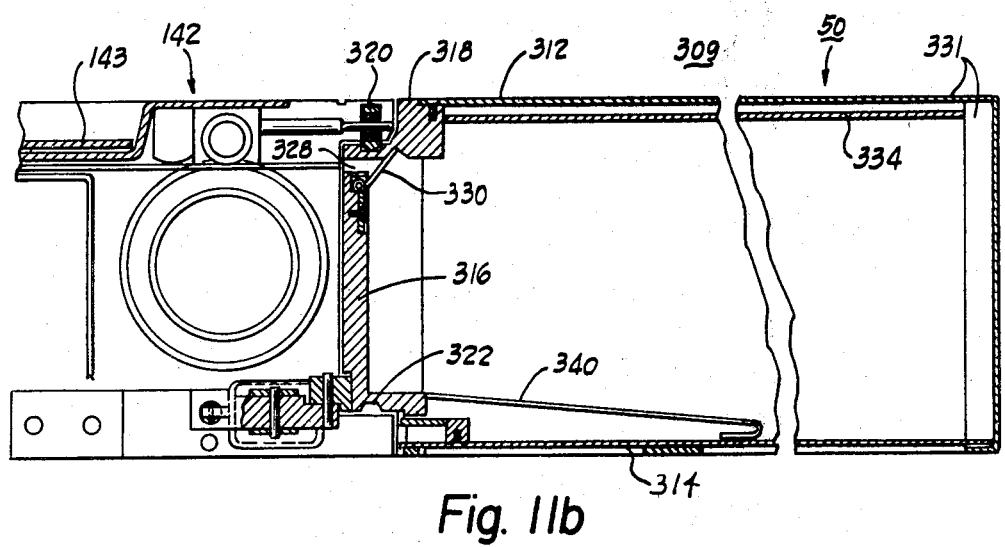

The receiving magazine 50 is partially depicted in FIGS. 11a and 11b. The receiving magazine 50 comprises a light-tight enclosure 309 having sides 310, a top 312, a sliding bottom 314, an end plate 316, with an upper slide support region 318 to which the top 312 is attached. The support region 318 and the end plate 316 ride on rollers 320 and a detent 322 for facilitating removal of the receiving magazine 50 from the film changer 26. As earlier mentioned, the feature of a removable magazine 50 to shorten overall dimensions of the film changer is outstanding. An interlock 323 (shown functionally in FIG. 2) is provided for disabling operation of the film changer unless the receiving magazine 50 is properly secured for operation onto the central unit 40.

The magazine 50 is releasably locked into the changer 26 by a push button latching arrangement 324. The latching arrangement 324 has a catch 326 which engages the end plate 316 for securing the magazine 50 into the changer 26.

The end plate 316 defines a slot 328 for receiving film packs 48 having exposed sheets of film. A spring biased shutter door 330 rotatably blocks the slot 328 and is forced open by an entering film pack 48. After the film pack 48 has entered the magazine 50, the shutter door 330 swings shut to maintain a light-tight environment surrounding the exposed sheets of X-ray film.

The receiving magazine 50 has a pair of bottom plate latching arrangements 332 which allow removal of the bottom plate 314 for removing the film packs 48 after they have been exposed. Each latching arrangement 332 includes a spring biased slide 336. The slide 336 engages a notch 338 in the end plate 316 to hold the bottom plate 310 in engagement.

A foam pad 331 covers the inside surfaces of the top 312 and opposite the end plate 316. The pad 331 acts as a cushion for the entering film packs 48 to absorb noise and impact. It also includes appropriate lead layer 334 to protect exposed film from further X-ray exposure.

To facilitate removal of the film packs 48 a spring ramp 340 is provided for guiding the lower edge of the film packs 48 over the edge of the bottom plate 314.

SYSTEM OPERATION

The motor 74 is initially actuated to drive the flywheel assembly 76 at a predetermined speed. When the flywheel assembly 76 has reached operating speed, the brake and clutch mechanism 78 periodically couples constant speed motion from the flywheel assembly to the transmission 80.

For high-speed, six-frames-per-second exposure operation, the brake and clutch 78 uninterruptedly couples flywheel motion to the transmission 80. For slower speeds of exposure operation, the brake and clutch mechanism 78 is intermittently braking the transmission input and effectively decoupling the transmission from the flywheel. The period of the interruption of the input motion is under the control of the controller and is selectable to provide, for example, radiographs at the rate of three frames per second which allows added time for exposure.

The intermittent output of the transmission 80 actuates the transport drive mechanism 137 and the shooting mechanism 174. In timed sequence the elevator mechanism 188 is actuated by the pressure release assembly 232 for lowering the film supporting platform 186. This momentarily releases an upward bias on the film. During the release of the bias, the shooting mechanism 174 causes reciprocation of the feed plunger 182 which advances the uppermost film on the platform 186 towards and through the slot 181. The film pack 48 advances to the pinch rolls 135 through which it is transported to the exposure station 44. During this time a previous film pack having an exposed sheet of film is concurrently transported into the collection magazine 50.

As a film pack is fed from the supply magazine to the exposure station, the evacuator rolls 138 serve to compress the film pack 48 to cause intimate engagement of the sheet 60 with the intensifying screens 62. As the film pack 48 moves into alignment in the exposure station 44, the evacuator rolls 138 uniformly engage the film 60 and screens 62 and then clamp the unsealed edge portion 65 of the pouch 64 to maintain the engagement during exposure. During passage of the film pack 48 through the evacuator rolls 138, the gas within the pouch 64 is exhausted and atmospheric pressure maintains intimate engagement of the film and the screens. The clamping by the evacuator rolls 138 of the unsealed edge portion of the pouch form a releasably air tight seal for maintaining the vacuum and maintaining the intimate engagement of the film and the screens.

After all transport movement has stopped, indicating that the film pack is positioned in the exposure station, the tube head 22 directs a beam of X-ray through the exposure station 44 for exposing the film 60. The film exposure is synchronized with the dwell time inherent in the harmonic motion of the output of the transmission 80. That is, each film is exposed at a time when it is momentarily at rest in the exposure station.

Tests have shown that the construction and arrangement of the film pack and the evacuator rolls temporarily maintain the intimate engagement of the film and screen even though air leaks develop in the film pack. More specifically, intimate engagement has been maintained for several seconds after puncture of the film pack. This unexpected and advantageous result appears to be due, in part, to surface tension between the film and screens.

SUMMARY

The improved serial radiographic system provides a relatively simple and efficient system for taking radiographs. The simplified film pack having a partially enclosed, reusable pouch and the transport system having evacuator rolls for generating a partial vacuum in the pouch reduce overall size, bulkiness and operating costs. The film pack and transport mechanism reliably engages the sheet of X-ray film and the intensifying screens and obviates the need for auxiliary cutting apparatus for slicing an opening in the pouch to retrieve the film. System vibration and noise from the movement of the film pack and the associated apparatus is minimized due to the relatively small mass of the moving film pack and due to the harmonic acceleration and deceleration characteristics of the intermittent motion transmission.

A highly efficient drive system is responsive to constant speed input motion and generates harmonic output motions for transporting the film to the exposure station and from the exposure system in concurrent movements. The drive system advantageously enables intermittent multispeed operation which allows additional exposure time of the X-ray film if needed. A novel and improved loading magazine and shooting mechanism is combined with the drive system for providing efficient system operation.

By eliminating nearly all X-ray absorbing apparatus and material from the exposure area, a see-through radiographic system is provided which allows unobstructed fluoroscopy. Because the image tube is completely noninterferent with radiography, the fluoroscopy mode can be performed before or after the taking of a radiograph; or, it can be performed in between serial runs of radiograph at any time when it is desired by actuating the mode selector solenoid.

To ensure fail-safe operation even upon power failure, a control mechanism is provided which must be energized in order to effect feeding of film packs from the supply magazine. This also ensures that an unwanted film pack does not remain in the exposure station after completion of a radiographic study.

Although the invention has been described in its preferred form with a certain degree of particularity, it is understood that the present disclosure has been made only by way of example. Numerous changes in the details and construction of the combination and arrangement of parts will be apparent without departing from the spirit and the scope of the invention.

What is claimed is:

1. A film changer in a radiographic system for taking a series of radiographs of a specimen comprising:
   (a) a housing structure, having an exposure station for receiving and exposing a plurality of unexposed X-ray film sheets sequentially,
   (b) a supply magazine carried by the structure near the station, the supply magazine being for storing a plurality of film packs each containing an unexposed X-ray film sheet,
   (c) a receiving magazine carried by the structure near the station for sequentially receiving the plurality of film sheets after they have been exposed,
   (d) a transport system for transporting the plurality of film sheets in sequence from the supply magazine to the exposure station, and from the exposure station to the receiving magazine, and
   (e) drive means for providing to said transport system harmonic drive motion having a preselectable dwell time between drive motions, said drive means including:
      (i) a transmission, having an input shaft and an output shaft, for providing a harmonic output motion on said output shaft in response to rotation of said input shaft,
      (ii) a prime mover for rotating said input shaft and,
      (iii) mechanism for selectively controlling the dwell time between harmonic output motions of the output shaft.

2. The film changer according to claim 1 wherein said prime mover is a motor and the drive means includes:
   (a) motor driven flywheel means operating at a substantially constant input speed, and
   (b) wherein the mechanism is a clutch and brake mechanism operable for selectable durations of time for coupling said flywheel means to said input shaft.

3. A radiographic mechanism comprising:
   (a) a housing structure defining spaced supply and collection regions and an exposure station therebetween;
   (b) a light-tight film supply mechanism in the supply region and including a supply opening near the exposure station, the supply opening being for allowing unexposed film supply pouches to be transported from the supply mechanism to the exposure station;
   (c) a collection mechanism in the collection region and including a receiving opening for receiving an exposed film pouch from the exposure station;
   (d) a film feed structure to transport an unexposed pouch along a path of travel from the supply mechanism through the supply opening to the exposure station and concurrently transport a pouch having an exposed sheet of film from the exposure station through the receiving opening to the collection mechanism when there is a pouch containing exposed film at the exposure station at the commencement of a feed cycle;
   (e) an X-ray tube head;
   (f) X-ray tube control means to cause an X-ray tube in the head to be energized and emit a beam of X-rays only after a pouch with an unexposed film has been transported to the exposure station; and,
   (g) pressure applying means disposed transversely of the path of travel between the supply mechanism and the exposure station for applying a line of pressure across a pouch being transported along the path and for progressively applying pressure from a leading end of an advancing pouch and to maintain a line of pressure across a pouch positioned in the exposure station so as to expell air from the pouch and force film and intensifying elements of the pouch together in firm surface engagement.

4. A radiographic film changer comprising:
   (a) a housing structure defining spaced supply and collection regions and an exposure station therebetween;
   (b) a supply magazine in the supply region for storing and supplying film packs having unexposed sheets of X-ray film to the exposure station;
   (c) a collection magazine in the collection region for receiving the film packs after exposure in the exposure station;
   (d) first pressure applying means disposed transversely of the path of travel between the supply magazine and the exposure station for applying an air expelling line of pressure across a film pack being transported along the path and into the exposure station; and, second pressure applying means disposed between the exposure station and the collection magazine for sequentially gripping exposed film packs along their margins and for ejecting them in sequence into the collection magazine.

5. The radiographic film changer according to claim 4 wherein the second pressure applying means has a relieved central portion whereby a centrally disposed, trailing tab member forming a part of a film pack may pass through the second force applying means without being gripped.

6. A radiographic mechanism comprising:
(a) a housing structure defining supply and collection regions and an exposure station;
(b) a film supply mechanism in the supply region for providing unexposed film supply pouches to be transported to the exposure station;
(c) a collection mechanism in the collection region and including a receiving opening for receiving an exposed film pouch from the exposure station;
(d) a film feed structure to transport an unexposed pouch along a path of travel from the supply mechanism to the exposure station and concurrently transport a pouch having an exposed sheet of film from the exposure station through the receiving opening to the collection mechanism when there is a pouch containing exposed film at the exposure station at the commencement of a feed cycle;
(e) an X-ray tube head;
(f) X-ray tube control means to cause an X-ray tube in the head to be energized and emit a beam of X-rays after a pouch with an unexposed film has been transported to the exposure station;
and,
(g) pressure applying means disposed transversely of the path of travel between the supply mechanism and the exposure station for applying a line of pressure across a pouch being transported along the path and for progressively applying pressure from a leading end of an advancing pouch and to maintain a line of pressure across a pouch positioned in the exposure station so as to expell air from the pouch and force film and intensifying elements of the pouch together in firm surface engagement.

* * * * *